US010052807B2

(12) United States Patent
Katai et al.

(10) Patent No.: US 10,052,807 B2
(45) Date of Patent: Aug. 21, 2018

(54) FIBER MANUFACTURING METHOD, NON-WOVEN FABRIC MANUFACTURING METHOD, AND FIBER MANUFACTURING EQUIPMENT

(71) Applicant: FUJIFILM Corporation, Tokyo (JP)

(72) Inventors: Yukihiro Katai, Kanagawa (JP);
Shigehisa Sugiyama, Kanagawa (JP);
Seiji Kasahara, Kanagawa (JP);
Yasuhisa Shimoda, Kanagawa (JP);
Masahiro Esaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 257 days.

(21) Appl. No.: 15/231,094

(22) Filed: Aug. 8, 2016

(65) Prior Publication Data

US 2016/0354964 A1 Dec. 8, 2016

Related U.S. Application Data

(63) Continuation of application No. PCT/JP2015/052473, filed on Jan. 29, 2015.

(30) Foreign Application Priority Data

Feb. 12, 2014 (JP) .................................. 2014-024935

(51) Int. Cl.
*D01D 5/06* (2006.01)
*D01D 5/11* (2006.01)
(Continued)

(52) U.S. Cl.
CPC .......... *B29C 47/0021* (2013.01); *B29B 11/04* (2013.01); *B29C 47/0014* (2013.01);
(Continued)

(58) Field of Classification Search
None
See application file for complete search history.

(56) References Cited

U.S. PATENT DOCUMENTS

| 3,842,151 A * | 10/1974 | Stoy et al. ............... D01D 5/04 |
| | | 264/184 |
| 5,071,599 A * | 12/1991 | McNair, Jr. .............. D01D 5/40 |
| | | 264/11 |
| 6,248,267 B1 | 6/2001 | Hosako et al. |

FOREIGN PATENT DOCUMENTS

| JP | 2821991 B2 | 11/1998 |
| JP | 2012-077388 A | 4/2012 |

OTHER PUBLICATIONS

International Search Report issued in PCT/JP2015/052473 dated Apr. 14, 2015.
(Continued)

*Primary Examiner* — Mary Lynn F Theisen
(74) *Attorney, Agent, or Firm* — Edwards Neils, LLC; Jean C. Edwards, Esq.

(57) ABSTRACT

A fiber manufacturing method includes the following steps of: dissolving a polymer in a solvent to obtain a polymer solution; spraying the polymer solution into a liquid heated to a boiling point of the solvent or higher, and evaporating the solvent to precipitate a fibrous polymer in a sealed precipitation tank, the liquid being immiscible with the polymer and the solvent; conveying the precipitated fibrous polymer in a liquid from the precipitation tank; water-rinsing the fibrous polymer conveyed in the liquid in the conveying step in a sealed water-rinsing tank; conveying the water-rinsed fibrous polymer in a liquid from the water-rinsing tank; and cooling and condensing solvent gas that is generated in the spraying step and the water-rinsing step.

9 Claims, 3 Drawing Sheets

(51) Int. Cl.
*D01F 2/28* (2006.01)
*D01F 13/02* (2006.01)
*D04H 1/4258* (2012.01)
*D04H 1/72* (2012.01)
*D04H 1/736* (2012.01)
*D21H 13/02* (2006.01)
*B29C 47/00* (2006.01)
*B29B 11/04* (2006.01)
*B29K 1/00* (2006.01)
*B29L 7/00* (2006.01)

(52) U.S. Cl.
CPC ............... *D01D 5/06* (2013.01); *D01F 2/28* (2013.01); *D01F 13/02* (2013.01); *D04H 1/4258* (2013.01); *D04H 1/72* (2013.01); *D04H 1/736* (2013.01); *B29K 2001/12* (2013.01); *B29L 2007/008* (2013.01); *D21H 13/02* (2013.01); *Y02P 70/627* (2015.11)

(56) References Cited

OTHER PUBLICATIONS

Written Opinion issued in PCT/JP2015/052473 dated Apr. 14, 2015.
First Office Action, issued by the State Intellectual Property Office (SIPO) of China dated Jul. 19, 2017, in connection with corresponding Chinese Patent Application No. 201580008384.4.

\* cited by examiner

FIBER MANUFACTURING METHOD, NON-WOVEN FABRIC MANUFACTURING METHOD, AND FIBER MANUFACTURING EQUIPMENT

CROSS-REFERENCE TO RELATED APPLICATIONS

This application is a Continuation of PCT International Application No. PCT/JP2015/052473 filed on Jan. 29, 2015, which was published under PCT Article 21(2) in Japanese, and which claims priority under 35 U.S.C § 119(a) to Japanese Patent Application No. 2014-024935 filed Feb. 12, 2014. The above applications are hereby expressly incorporated by reference, in their entirety, into the present application.

BACKGROUND OF THE INVENTION

1. Field of the Invention

The present invention relates to a fiber manufacturing method, a non-woven fabric manufacturing method, and fiber manufacturing equipment.

2. Description Related to the Prior Art

Cellulosic materials are currently attracting attention as biomass materials capable of being recycled by photosynthesis and as materials capable of being biodegraded in the environment. Non-woven fabrics made of cellulose triacetate that is one cellulosic material can be widely used for disposable diapers, masks, various filters, osmosis membranes, reverse osmosis membranes, moisture-permeable sheets, waterproof sheets, and the like.

As a non-woven fabric manufacturing method, for example, Japanese Patent Publication No. 3789006 (corresponding to United States Patent Publication No. 6248267) suggests a method of manufacturing discontinuous fibrillated fibers using a spinning nozzle having a polymer supply port, a coagulant supply port, and a mixing cell unit. In this manufacturing method, a polymer solution is supplied to the polymer supply port, steam is supplied to the coagulating material supply port, and the polymer solution is mixed with steam in the mixing cell unit and is coagulated. Additionally, Japanese Patent Publication No. 2821991 suggests cellulose acetate fibers assuming a fiber surface form having fine projections in a direction substantially perpendicular to a fiber axis in order to improve a dry feeling and color development properties. Moreover, Japanese Patent Application Publication No. 2012-77388 suggests a non-woven fabric manufacturing method of manufacturing a cellulose type non-woven fabric that has excellent mechanical physical properties, rigidity under high temperatures, and water absorptivity, using a method with a low environmental burden.

In the related-art non-woven fabric manufacturing methods, as described in Japanese Patent Publication No. 3789006, an acetone solution of cellulose diacetate is fibrillated by using steam as a coagulant. Additionally, as described in Japanese Patent Publication No. 2821991, for example, dry fiber spinning is performed using a methylene chloride or methanol solution of cellulose triacetate. However, in all of the above methods, it is necessary to recover or render harmless solvent gas that is generated in manufacturing processes because a solvent, such as acetone, methylene chloride, or methanol, is used as the solvent. For this reason, there is a problem that large-scale equipment and considerable energy are required for the recovery or rendering harmless. Accordingly, in the related art, in order to avoid mass processing of the solvent gas, small-quantity production is performed with small-scale production equipment, and the volume of a non-woven fabric obtained becomes small. Additionally, Japanese Patent Application Publication No. 2012-77388 discloses a melt-spinning method that does not use a solvent, and is one of solutions to the above problems. However, in order to obtain ultrafine fibers, a solution method using volumetric shrinkage accompanying solvent evaporation is excellent.

SUMMARY OF THE INVENTION

The invention solves such problems, and an object thereof is to provide a non-woven fabric manufacturing method and fiber manufacturing equipment that can perform recovery of a solvent efficiently, and a fiber manufacturing method by which a non-woven fabric with a large volume made of ultrafine fibers is obtained.

A fiber manufacturing method of the invention includes a polymer dissolving step (Step A), a polymer precipitating step (Step B), a first liquid delivery step (Step C), a water-rinsing step (Step D), a second liquid delivery step (Step E), and a condensing step (Step F). In Step A, a polymer is dissolved in a solvent to obtain a polymer solution. In Step B, the polymer solution is sprayed into a liquid heated to the boiling point of the solvent or higher, and the solvent is evaporated to precipitate the fibrous polymer in a sealed precipitation tank. The liquid is immiscible with the polymer and the solvent. In Step C, the precipitated fibrous polymer is conveyed in a liquid from the precipitation tank. In Step D, the fibrous polymer conveyed in the liquid in Step C is rinsed with water in the sealed water-rinsing tank. In Step E, the water-rinsed fibrous polymer is conveyed in a liquid from the water-rinsing tank. In Step F, solvent gas that is generated in Step B and Step D is cooled and condensed.

The non-woven fabric manufacturing method of the invention includes Step A, Step B, Step C, Step D, Step E, Step F, a step of separating out water (Step G), and a non-woven fabric forming step (Step H). In Step G, the water is separated from the fibrous polymer subjected to Step E to make a sheet polymer. In Step H, the sheet polymer is formed into a non-woven fabric.

In Step G, it is preferable that the sheet polymer made of the fibrous polymer is formed on a traveling mesh belt by spreading the water containing the fibrous polymer in a width direction of the mesh belt by a nozzle. In Step G, it is preferable to control the traveling speed of the mesh belt and the flow rate of the fibrous polymer from the nozzle to change the volume of the sheet polymer.

It is preferable to include a calendering step (Step I) in Step H. In Step I, the sheet polymer is sandwiched and conveyed by a plurality of rolls to obtain the non-woven fabric.

It is preferable that the polymer is cellulose acylate, the solvent is methylene chloride, the liquid is water, and the temperature of the solution of the cellulose acylate in Step B is 20° C. or higher and 40° C. or lower, and the temperature of the water is 40° C. or higher and 100° C. or lower.

Moreover, it is preferable to include a gas adsorbing step (Step J). In Step J, solvent gas that is generated in Step G is adsorbed.

A fiber manufacturing equipment of the invention includes a polymer dissolving tank, a sealed precipitation tank, a sealed water-rinsing tank, a tank for separating out water, a first liquid delivery unit, a second liquid delivery unit, and a condenser. The polymer dissolving tank dissolves a polymer in a solvent to obtain a polymer solution. The precipitation tank sprays the polymer solution into a liquid heated to the boiling point of the solvent or higher, and evaporates the solvent to precipitate the polymer in a fibrous state. The liquid is immiscible with the polymer and the solvent. The water-rinsing tank rinses the precipitated fibrous polymer with water. The tank for separating out water separates the water from the water-rinsed fibrous polymer. The first liquid delivery unit conveys the water containing the fibrous polymer in a liquid from the precipitation tank to the water-rinsing tank. The second liquid delivery unit conveys the water containing the fibrous polymer in a liquid from the water-rinsing tank to the tank for separating out water. The condenser cools and condenses solvent gas that is generated in the precipitation tank and the water-rinsing tank.

It is preferable that the liquid is water and it is preferable to include a separation tank that separates the liquid condensed by the condenser into water and solvent.

Advantageous Effects of Invention

According to the invention, reduction in volume is caused by spraying the polymer solution into the liquid that is immiscible with the polymer and the solvent and is heated to the boiling point of the solvent or higher, and evaporating the solvent to precipitate the fibrous polymer. Therefore, ultrafine fibers can be manufactured.

Additionally, according to the invention, the fibrous polymer precipitated in the precipitation tank is conveyed in a liquid from the precipitation tank. Therefore, the precipitation tank or the water-rinsing tank for handling of the fibrous polymer can be maintained in a sealed state without being opened to the ambient air. Therefore, the solvent evaporated in each tank can be received as a solvent gas containing water or steam without incorporating inert gases, such as the ambient air, and the solvent can be easily recovered by the condenser. For example, in the case of an open system, the ambient air or the like is mixed with the solvent gas, and an inert gas is incorporated into the solvent gas. Therefore, large-scale adsorption recovery using an adsorption column is required, and running costs and initial equipment costs increase. In the invention, since the solvent gas containing water or steam is used, the solvent can be efficiently recovered in the condenser. In addition, in the tank for separating out water of the fiber manufacturing equipment of the invention, the solvent gas leaks out from an outlet. However, since almost all the solvent gas is recovered in a sealed system of the precipitation tank and the water-rinsing tank, the leaking solvent gas can be recovered in a small-scale adsorption column.

According to the non-woven fabric manufacturing method of the invention, when the fibrous polymer is formed as a sheet, control of a volume is easy, and a large volume of non-woven fabric made of ultrafine fibers can be manufactured.

BRIEF DESCRIPTION OF DRAWINGS

For more complete understanding of the present invention, and the advantage thereof, reference is now made to the subsequent descriptions taken in conjunction with the accompanying drawings, in which.

DESCRIPTION OF THE PREFERRED EMBODIMENTS

Figure 1:
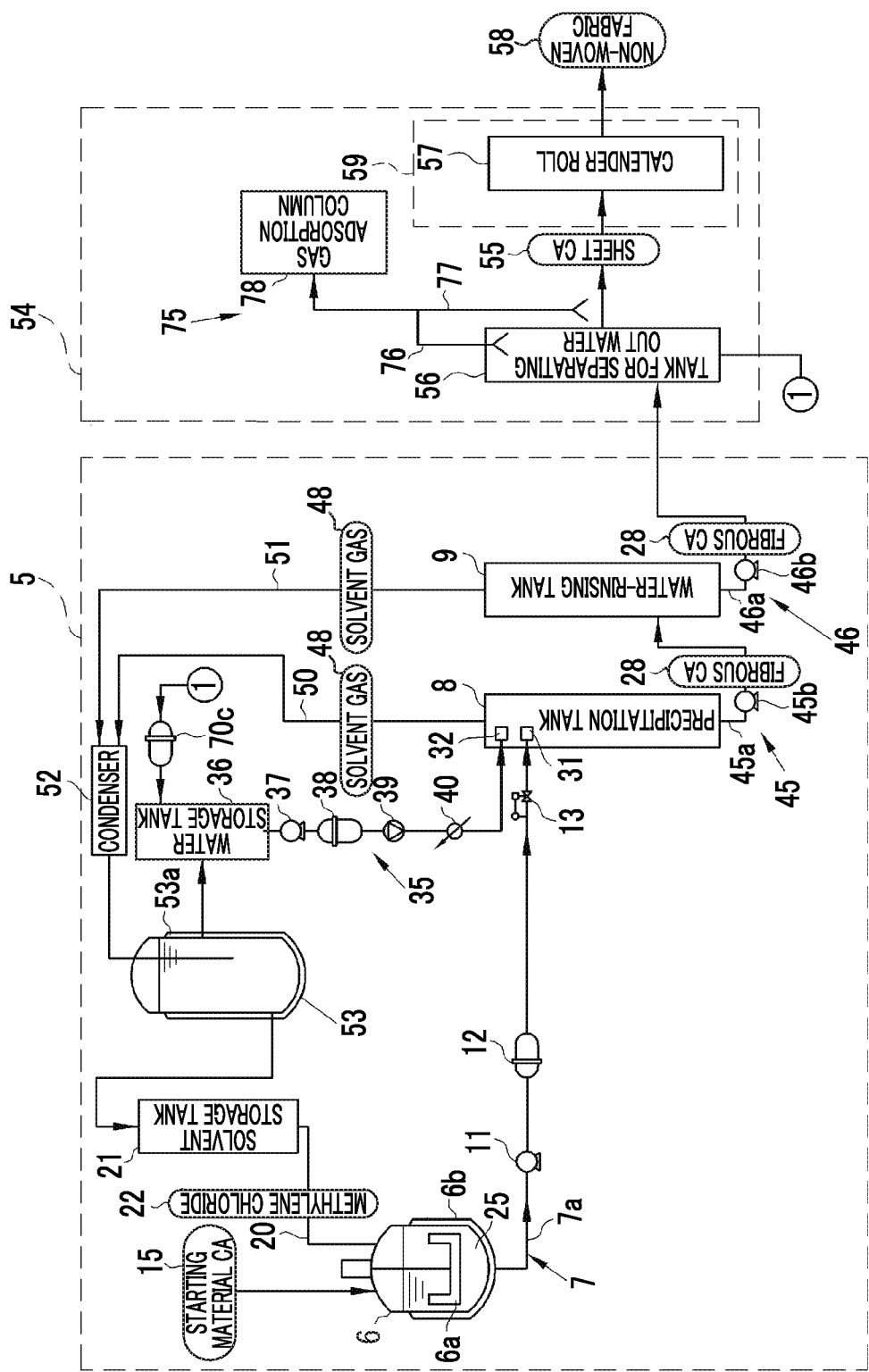
FIG. 1 is a schematic view illustrating a fiber manufacturing equipment and a non-woven fabric manufacturing equipment.

As illustrated in FIG. 1, a fiber manufacturing equipment 5 includes a polymer dissolving tank 6, a dope supply pipe 7, a precipitation tank 8, and a water-rinsing tank 9 sequentially from an upstream side in a flow direction of a polymer that is a starting material. The dope supply pipe 7 has a pump 11, a filter 12, and a pressure control valve 13 in addition to a pipe 7a.

A starting material cellulose acylate (hereinafter referred to as starting material CA) 15 as a starting material polymer is charged into the polymer dissolving tank 6. Additionally, a solvent storage tank 21 is connected to the polymer dissolving tank 6 via a solvent supply pipe 20. Methylene chloride 22 as a solvent is stored in the solvent storage tank 21. The methylene chloride 22 is charged into the polymer dissolving tank 6 by the solvent supply pipe 20. The polymer dissolving tank 6 has a stirrer 6a. In the stirrer 6a, the dissolution of the starting material CA 15 into the methylene chloride 22 is promoted, and a cellulose acylate solution (dope) 25 in which the starting material CA 15 is dissolved in the methylene chloride 22 is obtained.

The concentration (polymer solution concentration) of the starting material CA 15 in the dope 25 is 7 mass %. This polymer concentration is 0.5 mass % or more and 19 mass % or less, and preferably 2 mass % or more and 10 mass % or less. If the polymer concentration is less than 0.5 mass %, polymer does not turn fibrous easily when the polymer precipitates, and solvent removal costs are high, which are not preferable. Additionally, if the polymer concentration exceeds 19 mass %, viscosity is high and a pressure loss caused by filtration becomes high, which are not preferable. In addition, various additives may be added to the dope if necessary. As the additives, there are a plasticizer, an ultraviolet absorber, an antidegradant, a dye, an optical anisotropic control agent, an antistatic agent, a surfactant, a release agent, inorganic particulates (silica particles and the like), and the like. In this case, an addition unit having an addition nozzle, a static mixer, a dynamic mixer, or the like is used.

In the polymer dissolving tank 6, the temperature of the dope 25 is kept at, for example, 120° C. by virtue of a heating and heat-keeping effect using a jacket 6b. In addition, the dope is heated to a predetermined temperature by separately providing a heating device on a downstream side of the polymer dissolving tank 6 in addition to the heating of the dope 25 in the polymer dissolving tank 6. It is preferable that the temperature of the dope 25 is 20° C. or higher and 120° C. or lower. If the temperature of the dope 25 is lower than 20° C., cooling is required and energy required for evaporation becomes large, which are not preferable. Additionally, if the temperature of the dope exceeds 120° C., generally, the corrosion of a pipe material tends to occur, which is not preferable. The dope 25 is kept at a set temperature, for example, 120° C. up to the pressure control valve 13 of the dope supply pipe 7, and reaches near 40° C. in a state where the dope is injected from a first nozzle 31 as will be described below. The obtained dope 25 is sent to the filter 12 of the dope supply pipe 7.

In the filter 12, for example, about 5-μm foreign matter is removed from the sent dope 25. Although the type of the filter 12 is not particularly limited, an assistant filtration system, a metal filtration system, a filter paper filtration system, or the like is preferably used. As for absolute filtration precision in the respective filtration systems, it is preferable to determine the absolute filtration precision within a range of 2 μm or more and 30 μm or less depending on intended use. For example, the absolute filtration precision of 5 μm means that foreign mater that can be removed 99.9% or more has the size of 5 μm or more.

The pressure of the dope 25 that has passed through the filter 12 is kept constant by the pressure control valve 13, and is sent to the precipitation tank 8.

Figure 2:
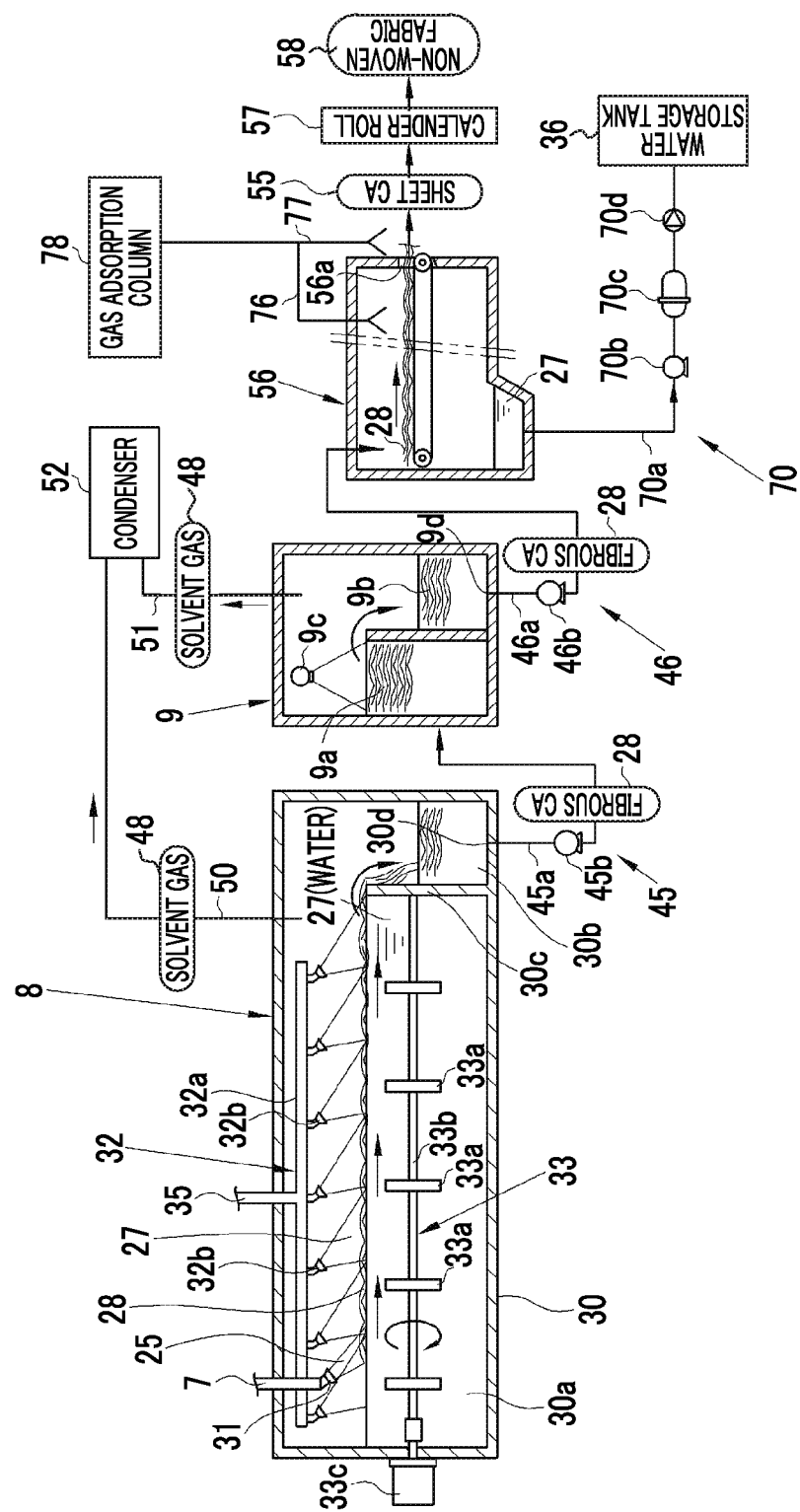
FIG. 2 is a side view illustrating the outline of a precipitation tank, a water-rinsing tank, and a tank for separating out water.

As illustrated in FIG. 2, the precipitation tank 8 has a tank body 30, the first nozzle 31, a second nozzle 32, and a stirrer 33. The tank body 30 has, for example, a transverse cylinder tank used therefor, and the interior thereof is partitioned into a first tank 30*a* and a second tank 30*b* by a partition plate 30*c*. The tank body 30 is of a closed type, and the gas and liquid inside the tank body do not leak out to the outside.

The stirrer 33 is disposed in the first tank 30*a*. The stirrer 33 has a rotating shaft 33*b* having stirring blades 33*a*, and a motor 33*c*. The rotating shaft 33*b* is horizontally disposed in the first tank 30*a*, and has the stirring blades 33*a* attached thereto at regular intervals. One end of the rotating shaft 33*b* protrudes from the tank body 30 to the outside in a water-tight state, and the motor 33*c* is connected to this one end. The stirrer 33 stirs water 27 in the first tank 30*a*, and keeps water surface temperature constant.

One rotating shaft 33*b* or a plurality of rotating shafts may be provided. In a case where a plurality of rotating shafts are provided, rotational directions of adjacent rotating shafts may be different from each other or may be the same direction. It is preferable to make the water 27 flow toward the second tank 30*b* near the surface of the water. In addition, the arrangement direction of the stirring blades 33*a* and the type of the stirring blades 33*a* are not limited to those in the illustrated examples, and are sufficient so long as the water 27 within the precipitation tank 8 can be stirred. Additionally, the stirrer 33 may not be used, but the water 27 may be separately supplied from a side surface of the first tank 30*a* toward the second tank 30*b*, and the water 27 of the first tank 30*a* may be stirred by a water stream. Moreover, the stirring may be performed using both the water stream and the stirrer.

The water 27 is stored in the first tank 30*a*. The water 27 is kept at a temperature equal to or higher than the boiling point of the methylene chloride 22, and evaporates the methylene chloride 22 in the dope 25. The second tank 30*b* serves as a discharge unit for the water 27 that has overflowed from the first tank 30*a*, and a fibrous CA 28 to be described below, and has a discharge port 30*d* formed at a bottom part thereof.

The first nozzle 31 and the second nozzle 32 are disposed in an upper part of an inner surface of the precipitation tank 8. The dope supply pipe 7 is connected to the first nozzle 31. The first nozzle 31 injects the dope 25 toward the surface of the water. The dope supply pipe 7 from the pressure control valve 13 (refer to FIG. 1) to the first nozzle 31 of the precipitation tank 8 is formed short, and the dope 25 is stably flash-evaporated within the precipitation tank 8. In addition, although one first nozzle 31 is disposed, the number of first nozzles to be arranged may be appropriately increased without being limited to one.

The second nozzle 32 has a nozzle head 32*a* and a nozzle body 32*b*, and has a water supply unit 35 connected thereto. The nozzle head 32*a* is disposed in a longitudinal direction of the precipitation tank 8. A plurality of nozzle bodies 32*b* are disposed at a predetermined pitch in the nozzle head 32*a*. The water supply unit 35 sends the water 27 from a water storage tank 36 (refer to FIG. 1) to the second nozzle 32. Accordingly, the water 27 is injected from the second nozzle 32 and is sprayed toward the surface of the water. It is preferable that the temperature of the water 27 supplied to the precipitation tank 8 is 40° C. or higher and 100° C. or lower. At lower than 40° C., the methylene chloride 22 does not evaporate and precipitation becomes impossible. Additionally, if the temperature of the water exceeds 100° C., a pressurization operation is required in order to maintain the water 27 in a liquid state, all of which are not preferable. Additionally, the dope 25 injected from the first nozzle 31, and the water 27 injected from the nozzle body 32*b* are brought into contact with each other in the space from the first nozzle 31 to the surface of the water. As a result, the dope 25 can be stretched or the evaporation of the methylene chloride 22 can be quickly advanced, and ultrafiner and longer fibrous CA 28 can be obtained.

It is preferable to perform the spraying of the dope 25 by the first nozzle 31 and the spraying of the water 27 by the second nozzle 32 uniformly in a width direction of the tank body 30. Accordingly, the cellulose acylate precipitates efficiently.

As illustrated in FIG. 1, the water supply unit 35 has the water storage tank 36, a pump 37, a filter 38, a check valve 39, and a thermoregulator 40. The water storage tank 36 has a temperature control function, and keeps the water 27 at a predetermined temperature. The pump 37 adjusts the flow rate of the water 27 by adjusting the number of rotations. The filter 38 filters foreign matter from the water 27. The thermoregulator 40 performs the final temperature control of the water 27 of which the temperature is controlled in the water storage tank 36. Accordingly, the water 27 (refer to FIG. 2) heated to an optimal temperature is injected at a predetermined flow rate from the second nozzle 32 toward the surface of the water. In addition, although the water supply unit 35 sends the water 27 to the precipitation tank 8 by means of the second nozzle 32, the water supply unit may supply the water 27 separately to the first tank 30*a* in addition to this.

As illustrated in FIG. 2, the dope 25 injected from the first nozzle 31 comes into contact with the water 27 within the precipitation tank 8. The water 27 is heated to and kept at the boiling point of methylene chloride 22 or higher. For this reason, the methylene chloride 22 in the dope 25 that has come into contact with the water 27 evaporates instantaneously (flash evaporation) due to the heating caused by the water 27, the starting material CA 15 precipitates in a fibrous state in the water 27, and turns into the fibrous cellulose acylate (hereinafter simply referred to as the fibrous CA (fibrous polymer)) 28. Since the water 27 heated (for example, 80° C.) to the boiling point of the methylene chloride 22 or higher is sprayed from the second nozzle 32, the evaporation of the methylene chloride 22 in the dope 25 is promoted also from above the surface of the water.

The water 27 near the surface of the water flows toward the second tank 30*b* together with the fibrous CA 28 by the rotation of the stirrer 33 or the water stream of the water 27 supplied separately. The plurality of nozzle bodies 32*b* of the second nozzle 32 is disposed in an inclined manner so that an injection direction faces a discharge direction of the fibrous CA 28. Therefore, the fibrous CA 28 is delivered toward the second tank 30*b* also by the extrusion caused by the water 27 injected from the second nozzle 32. In addition, instead of sending the fibrous CA 28 toward to the second tank 30*b* by means of the current of the water 27, or in addition to this, a roller or other conveying units may be used.

The second tank 30b is formed at the other end of the precipitation tank 8. The discharge port 30d is formed at the bottom of the second tank 30b. A first liquid delivery unit 45 is connected to the discharge port 30d. The first liquid delivery unit 45 has a pipe 45a and a pump 45b, and conveys the fibrous CA 28 in a liquid to the water-rinsing tank 9 together with the water 27 (the first liquid delivery step).

The water-rinsing tank 9 has a water-rinsing unit 9a, a discharge unit 9b, and a nozzle 9c. In the water-rinsing unit 9a, for example, the water 27 is injected from the nozzle 9c, and the fibrous CA 28 is rinsed with water. The water-rinsing unit 9a is configured such that one or a plurality of tanks are concatenated. The discharge unit 9b stores the water-rinsed fibrous CA 28 temporarily. The water-rinsing tank 9 completely removes the water passing through the first liquid delivery unit 45, and a high-concentration methylene chloride component accompanying the fibrous CA 28. Although the high-concentration methylene chloride component is removed in the precipitation tank 8, the high-concentration methylene chloride near the surface of the water of the precipitation tank 8 may be entrained or may accompany the fibrous CA. For this reason, the water-rinsing tank 9 removes the methylene chloride component completely so that methylene chloride gas is not released indoors.

A discharge port 9d is formed at the bottom of the discharge unit 9b. A second liquid delivery unit 46 is connected to the discharge port 9d. The second liquid delivery unit 46 has a pipe 46a and a pump 46b, and conveys the water 27 mingled with the fibrous CA 28 in a liquid to a tank 56 for separating out water (the second liquid delivery step).

In the precipitation tank 8 and the water-rinsing tank 9, the water 27 and the fibrous CA 28 are conveyed in a liquid by the first liquid delivery unit 45 and the second liquid delivery unit 46. Thus, sealing is held. For this reason, ambient air does not enter the precipitation tank 8 and the water-rinsing tank 9. A solvent gas (methylene chloride) 48 of the precipitation tank 8 and the water-rinsing tank 9 is sent to a condenser 52 together with steam by solvent gas recovery pipes 50 and 51. The solvent gas recovery pipes 50 and 51 have a switching valve and a pump of which the illustration is omitted. In the condenser 52, the steam sent from the precipitation tank 8 and the water-rinsing tank 9 and the solvent gas 48 with which the methylene chloride 22 is mixed perform heat exchange with, for example, cooling water, and is condensed and liquefied. The condensed liquid is sent to a separation tank 53 (the condensing step).

The separation tank 53 divides the liquid into the methylene chloride 22 and the water 27. Since the methylene chloride 22 has a larger specific gravity than the water 27, the methylene chloride 22 is located in a lower layer, and the water 27 is located in an upper layer. The separation tank 53 has a jacket 53a. In the jacket 53a, for example water is circulated as a temperature control medium, and the methylene chloride 22 and the water 27 are kept at a proper temperature.

The water 27 separated in the separation tank 53 is returned to the water storage tank 36 after passed through a filter (not illustrated). In addition, the water may be reused for other applications or wasted instead of being returned to the water storage tank 36. The methylene chloride 22 is sent to and stored in the solvent storage tank 21, and is reused.

The fiber manufacturing equipment 5 is constituted of the polymer dissolving tank 6, the dope supply pipe 7, the precipitation tank 8, the water-rinsing tank 9, the condenser 52, and the separation tank 53. A fiber manufacturing step is performed by the fiber manufacturing equipment 5. Additionally, a polymer dissolving step is performed by the polymer dissolving tank 6, a polymer precipitating step is performed by the precipitation tank 8, and a water-rinsing step is performed by the water-rinsing tank 9.

Figure 3:
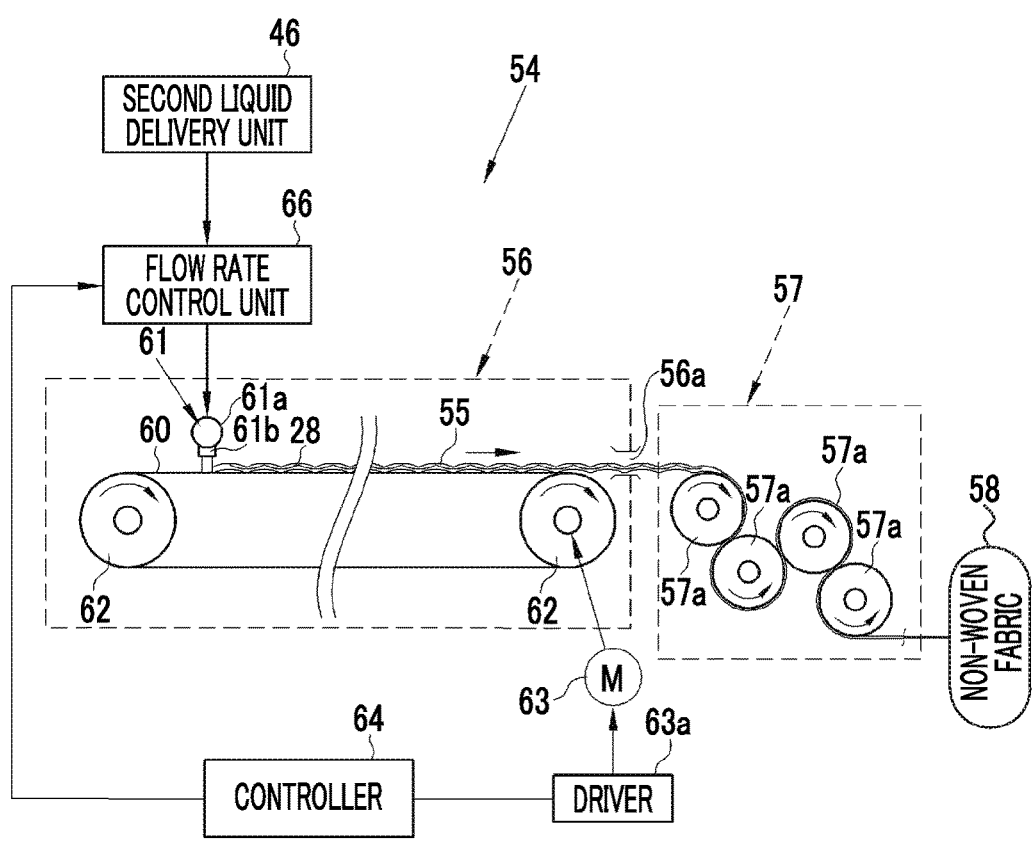
FIG. 3 is a schematic view illustrating the non-woven fabric manufacturing equipment.

As illustrated in FIG. 1, the fibrous CA 28 obtained by the fiber manufacturing equipment 5 is sent to a non-woven fabric manufacturing equipment (non-woven fabric forming apparatus) 54, and a non-woven fabric 58 is manufactured. The non-woven fabric manufacturing equipment 54 includes the tank 56 for separating out water and a calender roll 57. As illustrated in FIG. 3, the tank 56 for separating out water has a mesh belt 60 and a nozzle 61 therein, and spreads the fibrous CA 28 uniformly in a width direction of the mesh belt 60 on the mesh belt 60. A water separating step is performed by the tank 56 for separating out water. The mesh belt 60 is stretched over a plurality of rollers 62. A motor 63 is connected to one roller 62. The rotation of the motor 63 is controlled by a controller 64 via a driver 63a. The mesh belt 60 is circulated and travels by the rotation of the rollers 62.

The meshes of the mesh belt 60 have a size such that the fibrous CA 28 does not go therethrough. Therefore, only the fibrous CA 28 remains on the mesh belt 60, and the water 27 passes through the mesh belt 60. Accordingly, a sheet CA (sheet polymer) 55 is formed by the fibrous CA 28 that remains on the mesh belt 60.

The nozzle 61 has a head 61a and a plurality of nozzle bodies 61b. The head 61a is disposed in the width direction of the mesh belt 60. The nozzle bodies 61b are arranged at predetermined intervals in the head 61a. The second liquid delivery unit 46 is connected to the head 61a, and the water 27 mingled with the fibrous CA 28 is supplied to the head. Otherwise, the head 61a may be periodically reciprocated in the width direction, so as to spread the water 27 mingled with the fibrous CA 28 on the mesh belt 60.

A flow rate control unit 66 controls the flow rate of the water 27 mingled with the fibrous CA 28, which is supplied to the nozzle 61. The controller 64 controls any one or both of the amount of supply of the water 27 mingled with the fibrous CA 28 and the traveling speed of the mesh belt 60 via the flow rate control unit 66 according to the volume of the sheet CA 55. For example, in a case where thick (high volume) sheet CA 55 is desired, the flow rate of the water 27 is increased or the traveling speed of the mesh belt 60 is lowered. In a case where thin (volume is small) sheet CA 55 is desired, the flow rate of the water 27 is decreased or the traveling speed of the mesh belt 60 is raised. The volume of the sheet CA 55 is changed in this way.

In addition, although illustration is omitted, the tank 56 for separating out water may be provided with a blast head, a micro-vibration device, or the like. The blast head blows off warm air, for example, hot air toward the sheet CA 55, and promotes dryness. Additionally, the micro-vibration device can promote the separation of the water 27 and promote the mutual entanglement of the fibrous CA 28 by vibrating the mesh belt 60.

As illustrated in FIG. 2, the water 27 separated in the tank 56 for separating out water is sent to the water storage tank 36 via a water recovery pipe 70. The water recovery pipe 70 has a pipe 70a, a pump 70b, a filter 70c, and a check valve 70d. The filter 70c filters foreign matter, such as the fibrous CA 28, which are contained in the water 27. In addition, the water recovery pipe 70 may be omitted, and the water 27 separated in the tank 56 for separating out water may be subjected to waste disposal without being circulated and used.

The tank 56 for separating out water may be provided with a squeeze roller that holds and squeezes the sheet CA 55. The squeeze roller squeezes moisture out of the sheet CA 55. Additionally, if the water 27 of the water storage tank 36 reaches a certain amount or lower, the certain amount of water 27 is replenished by a water supply pipe (not illustrated).

The sheet CA 55 that has come out of the tank 56 for separating out water has a desired thickness and becomes the non-woven fabric 58, through a calendering step. In the calendering step, the sheet CA 55 is made to pass between a plurality of rolls 57a, using a calender roll 57. Accordingly, the sheet CA 55 becomes the non-woven fabric 58 having a certain thickness. The non-woven fabric manufacturing equipment 54 is constituted by the calender roll 57 serving as the tank 56 for separating out water and a non-woven fabric forming apparatus 59. Additionally, a non-woven fabric forming step is performed by the calender roll 57. The non-woven fabric 58 is formed in a shipment-allowable state, for example, in the shape of a roll, in the shape of a sheet, or the like. Thereafter, the non-woven fabric 58 is used to manufacture a mask, a filter, a disposable diaper, or the like as an end product.

In addition, the non-woven fabric forming apparatus 59 may enhance the bonding of the fibrous CA 28, using well-known methods, such as a thermal bonding method, a chemical bonding method, a needle punch method, a spun lace method (water stream entangling method), a stitch bonding method, and a steam jet method, instead of using the calender roll 57 or in addition to this calender roll.

In the thermal bonding method, the fibrous CA 28 is melted with heat and is bonded together. In the chemical bonding method, the fibrous CA 28 is bonded together by being impregnated in an adhesive or blowing off an adhesive. In the needle punch method, the fibrous CA 28 is mechanically bonded together by piercing with a needle with a hook. In the spun lace method (water stream entangling method), the fibrous CA 28 is entangled using a high-pressure water stream. In the stitch bonding method, the fibrous CA 28 is bonded together by adding a needle punch to the sheet CA 55 from a certain direction, for example, on a guide belt. In the steam jet method, the fibrous CA 28 is bonded together by blowing off heating steam.

The methylene chloride 22 used in the present embodiment is a substance of which the use and wasting are monitored by Pollutant Release and Transfer Register (PRTR) from the concern of an environmental burden and toxicity to humans. For this reason, the discharge of the methylene chloride from the inside of factory building to the outdoors should be avoided. Therefore, the amount of methylene chloride gas that leaks from respective devices is made as small as possible in addition to making a building into a double structure to enhance sealability.

In the present embodiment, since the precipitation tank 8 and the water-rinsing tank 9, and the water-rinsing tank 9 and the tank 56 for separating out water are connected together by the first liquid delivery unit 45 and the second liquid delivery unit 46, and the precipitation tank 8 and the water-rinsing tank 9 are sealed, the solvent gas 48 does not leak to the outside. However, the tank 56 for separating out water has an outlet 56a for discharging the sheet CA 55 from the tank 56 for separating out water. Although the solvent gas 48 in the tank 56 for separating out water leaks from the tank 56 for separating out water to the outside via the outlet 56a, the solvent gas 48 has already been removed substantially from the precipitation tank 8 and the water-rinsing tank 9, and thus the amount of the solvent gas 48 that leaks from the tank 56 for separating out water to the outside is minute. In order to recover the minute amount of solvent gas 48, a solvent gas recovery unit 75 is connected to the inside of the tank 56 for separating out water and the outside of the outlet 56a of the tank 56 for separating out water. The solvent gas recovery unit 75 has adsorption pipes 76 and 77 and a gas adsorption column 78. The gas adsorption column 78 performs the gas adsorbing step. The gas adsorption column 78 adsorbs the solvent gas 48 by a well-known method, separates a solvent from this adsorbed solvent gas, and recovers the solvent (the gas adsorbing step).

In addition, although illustration was omitted, a building and arrangement spaces for the respective devices are partitioned as sealed spaces. The solvent gas 48 is recovered for every partitioned unit, and is adsorbed and recovered by the gas adsorption column or the like. For this reason, even in a case where methylene chloride gas leaks from the tank 56 for separating out water, the methylene chloride gas is eventually trapped, and is not released to the outside of a building.

As described above, the non-woven fabric manufacturing equipment includes the polymer dissolving tank, the precipitation tank, the water-rinsing tank, the tank for separating out water, the first liquid delivery unit, the second liquid delivery unit, the condenser, and the non-woven fabric forming apparatus. The polymer dissolving tank dissolves the polymer in the solvent to obtain a polymer solution. The precipitation tank sprays the polymer solution into the liquid heated to the boiling point of the solvent or higher, and evaporates the solvent to precipitate the polymer in a fibrous state. The liquid is immiscible with the polymer and the solvent. The water-rinsing tank rinses the precipitated fibrous polymer with water. The water separation tank separates the water from the fibrous polymer to make the sheet polymer. The first liquid delivery unit conveys the water containing the fibrous polymer in a liquid from the precipitation tank to the water-rinsing tank. The second liquid delivery unit conveys the water containing the fibrous polymer in a liquid from the water-rinsing tank to the tank for separating out water. The condenser cools and condenses the solvent gas that is generated in the precipitation tank and the water-rinsing tank. The non-woven fabric forming apparatus forms the sheet polymer into the non-woven fabric.

It is preferable that the tank for separating out water has the nozzle and the traveling mesh belt and the nozzle spreads the water containing the fibrous polymer in the width direction of the mesh belt to form the sheet made of the fibrous polymer on the mesh belt. It is preferable to include the control unit that controls either the traveling speed of the mesh belt or the flow rate of the fibrous polymer from the nozzle, to change the volume of the sheet.

It is preferable that the polymer is the cellulose acylate, the solvent is the methylene chloride, the liquid is the water, and the temperature of the solution of the cellulose acylate in the precipitation tank is 20° C. or higher and 40° C. or lower, and the temperature of the water is 40° C. or higher and 100° C. or lower. It is preferable to include the separation tank that separates the liquid condensed by the condenser into the water and the solvent. It is preferable to include the gas adsorption column that adsorbs the solvent gas that is generated in the tank for separating out water.

Next, the operation of the present embodiment will be described. As illustrated in FIG. 1, when the fibrous CA 28 is manufactured, the starting material CA 15 and the methylene chloride 22 are put into the polymer dissolving tank 6 and are stirred by the stirrer 6a, and the dope 25 in which the polymer solution concentration is, for example, 7 mass % is made. After the dope 25 is filtered by the filter 12, the dope is adjusted to maintain a constant pressure by the pressure control valve 13 and is sent to the first nozzle 31 of the precipitation tank 8. In the present embodiment, since the concentration of the dope 25 is set to 7 mass %, there is a little filtration load, and highly efficient filtration becomes possible.

As illustrated in FIG. 2, the dope 25 is injected from the first nozzle 31 toward the surface of the water within the precipitation tank 8 and is diffused on the surface of the water. The temperature of the water 27 is set to a temperature higher than the boiling point of the methylene chloride 22. Therefore, the methylene chloride 22 in the dope 25 that has come into contact with the surface of the water evaporates instantaneously due to the heat from the water 27, and the ultrafine fibrous CA 28 is obtained. In the fibrous CA 28, the methylene chloride 22 is efficiently evaporated also by the water shower from the second nozzle 32. Additionally, the fibrous CA 28 is sent to the second tank 30b with the injection of the water 27 or the steam of water 27 from the stirrer 33 and the second nozzle 32.

The fibrous CA 28 that is temporarily stored in the second tank 30b is conveyed in a liquid toward the water-rinsing tank 9 together with water 27 by the first liquid delivery unit 45. The fibrous CA 28 is rinsed with water in the water-rinsing tank 9. The fibrous CA 28 after the water-rinsing is sent to the tank 56 for separating out water together with the water 27 by the second liquid delivery unit 46. As illustrated in FIG. 3, in the tank 56 for separating out water, the fibrous CA 28 is spread on the mesh belt 60, and the sheet CA 55 is obtained. The obtained sheet CA 55 is made to have a desired thickness by the calender roll 57, and the non-woven fabric 58 is obtained.

In the present embodiment, in order to evaporate the methylene chloride 22 with the water 27 heated to the boiling point of the methylene chloride 22 or higher, by using the dope that has dissolved starting material CA 15 with the methylene chloride 22, the loss of heat energy of the ultrafine fibrous CA 28 can be reduced with a simple equipment configuration, and the ultrafine fibrous CA can be efficiently made. Moreover, the ultrafine fibrous CA 28 with a few impurities and the non-woven fabric 58 made of the ultrafine fibrous CA 28 can be manufactured by precipitating the fibrous CA 28 using the dope 25 without foreign matter. Additionally, a step of mixing fibers with water, which is required in related-art non-woven fabric manufacturing methods, becomes unnecessary, and fibers are sprayed into water simultaneously with precipitation by a precipitating step. Therefore, a non-woven fabric can be more simply manufactured.

In order to convey the fibrous CA 28 in a liquid from the precipitation tank 8 and the water-rinsing tank 9, the precipitation tank 8 and the water-rinsing tank 9 is not open to the external air. Accordingly, the entry of air into the precipitation tank 8 and the water-rinsing tank 9 or conversely the leak of the solvent gas from the precipitation tank 8 and the water-rinsing tank 9 does not occur. Therefore, an inert gas is not mixed with the solvent gas 48, a large-scale gas adsorption column becomes unnecessary, and initial equipment costs or running costs can be reduced. Additionally, the solvent gas 48 can be efficiently recovered by the condenser 52 and the separation tank 53.

In the above embodiment, the methylene chloride 22 is used as the solvent for the starting material CA 15. However, other single solvents or mixed solvents may be used as long as the solvents are good solvents. In addition, in cases where the single solvents are used, recovery and reuse of the solvents become simple. The liquid for precipitating fibers just has to be a liquid that can be heated to the boiling point of a solvent or higher, and other liquids other than water may be used. In addition, in cases where the mixed solvents are used, the mixed solvents recovered by the solvent gas recovery pipes 50 and 51 are separated and recovered as respective solvents or are reused as the mixed solvent.

The polymer that can be used for the invention is not particularly limited so long as the polymer is thermoplastic resin, which includes cellulose acylate, a lactone-ring-containing polymer, annular polyolefin, polycarbonate, a methacrylic ester polymer, polyester, or the like. The cellulose acylate and the annular polyolefin are especially preferable. Among these, cellulose acylates containing an acetate group and a propionate group, and annular polyolefin and polymethyl methacrylate that are obtained by addition polymerization are particularly preferable.

The kind of an acyl group used for the cellulose acylate of the invention may be only one, or two or more kinds of acyl groups may be used. When the two or more kinds of acyl groups are used, it is preferable that one of the acyl groups is an acetyl group. It is preferable that a ratio in which a hydroxyl group of cellulose is esterified with carboxylic acid, that is, the degree of substitution of the acyl group satisfies the following Expressions (I) to (III). In addition, in the following Expressions (I) to (III), A and B represent the degrees of substitution of the acyl group, A is the degree of substitution of the acetyl group, and B is the degree of substitution of the acyl group with the number of carbon atoms of 3 to 22. In addition, it is preferable that 90 mass % or more of triacetylcellulose (TAC) is particles of 0.1 mm or more and 4 mm or less.

$$2.0 \leq A+B \leq 3.0 \quad (I)$$

$$1.0 \leq A \leq 3.0 \quad (II)$$

$$0 \leq B \leq 2.9 \quad (III)$$

The total degree A+B of substitution of the acyl group is more preferably 2.20 or more and 2.90 or less, and particularly preferably 2.40 or more and 2.88 or less. Additionally, the degree B of substitution of the acyl group with the number of carbon atoms of 3 to 22 is more preferably 0.30 or more and particularly preferably 0.5 or more. The cellulose that is a starting material of the cellulose acylate may be obtained from either linter or pulp.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A fiber manufacturing method comprising the following steps of:
    (A) dissolving a polymer in a solvent to obtain a polymer solution;
    (B) spraying the polymer solution into a liquid heated to a boiling point of the solvent or higher, and evaporating the solvent to precipitate a fibrous polymer in a sealed precipitation tank, the liquid being immiscible with the polymer and the solvent;
    (C) conveying the precipitated fibrous polymer in a liquid from the precipitation tank;
    (D) water-rinsing the fibrous polymer conveyed in the liquid in the step (C) in a sealed water-rinsing tank;

(E) conveying the water-rinsed fibrous polymer in a liquid from the water-rinsing tank; and (F) cooling and condensing solvent gas that is generated in the step (B) and the step (D).

2. A non-woven fabric manufacturing method comprising the following steps of:

(A) dissolving a polymer in a solvent to obtain a polymer solution;

(B) spraying the polymer solution into a liquid heated to a boiling point of the solvent or higher, and evaporating the solvent to precipitate a fibrous polymer in a sealed precipitation tank, the liquid being immiscible with the polymer and the solvent;

(C) conveying the precipitated fibrous polymer in a liquid from the precipitation tank;

(D) water-rinsing the fibrous polymer conveyed in the liquid in the step (C) in a sealed water-rinsing tank;

(E) conveying the water-rinsed fibrous polymer in a liquid from the water-rinsing tank;

(F) cooling and condensing solvent gas that is generated in the step (B) and the step (D);

(G) separating water from the fibrous polymer subjected to the step (E) to obtain a sheet polymer; and (H) forming the sheet polymer into a non-woven fabric.

3. The non-woven fabric manufacturing method according to claim 2,
wherein, in the step (G), the sheet polymer made of the fibrous polymer is formed on a traveling mesh belt by spreading the water containing the fibrous polymer by a nozzle in a width direction of the mesh belt.

4. The non-woven fabric manufacturing method according to claim 3,
wherein, in the step (G), the volume of the sheet polymer is changed by controlling the traveling speed of the mesh belt and the flow rate of the fibrous polymer from the nozzle.

5. The non-woven fabric manufacturing method according to claim 2,
further comprising: the following step in the step (H),
(I) sandwiching and conveying the sheet polymer with a plurality of rolls to obtain the non-woven fabric.

6. The non-woven fabric manufacturing method according to claim 2,
wherein the polymer is cellulose acylate, the solvent is methylene chloride, the liquid is water, the temperature of the cellulose acylate solution in the step (B) is 20° C. or higher and 40° C. or lower, and the temperature of the water is 40° C. or higher and 100° C. or lower.

7. The non-woven fabric manufacturing method according to claim 2,
further comprising: the following step,
(J) adsorbing solvent gas that is generated in the step (G).

8. A fiber manufacturing equipment comprising:
a polymer dissolving tank that dissolves a polymer in a solvent to obtain a polymer solution;
a sealed precipitation tank that sprays the polymer solution into a liquid heated to a boiling point of the solvent or higher, and evaporates the solvent to precipitate the polymer in a fibrous state, the liquid being immiscible with the polymer and the solvent;
a sealed water-rinsing tank that rinses the precipitated fibrous polymer with water;
a tank for separating out water that separates water from the water-rinsed fibrous polymer;
a first liquid delivery unit that conveys the water containing the fibrous polymer in a liquid from the precipitation tank to the water-rinsing tank;
a second liquid delivery unit that conveys the water containing the fibrous polymer in a liquid from the water-rinsing tank to the tank for separating out water; and
a condenser that cools and condenses solvent gas that is generated in the precipitation tank and the water-rinsing tank.

9. The fiber manufacturing equipment according to claim 8,
wherein the liquid is water, and a separation tank is provided to separate a liquid condensed in the condenser into water and the solvent.

* * * * *